United States Patent [19]
Hassler

[11] Patent Number: 5,245,586
[45] Date of Patent: Sep. 14, 1993

[54] APPARATUS AND METHOD FOR SUPPRESSING REFLECTIONS AT AN ULTRASOUND TRANSDUCER

[75] Inventor: Dietrich Hassler, Flurweg 3, W8525 Uttenreuth, Fed. Rep. of Germany

[73] Assignee: Siemens Aktiengesellschaft, Munich, Fed. Rep. of Germany

[21] Appl. No.: 969,075

[22] Filed: Oct. 30, 1992

[30] Foreign Application Priority Data

Nov. 15, 1991 [EP] European Pat. Off. ......... 91119565.9

[51] Int. Cl.$^5$ ................................................. G01S 7/52
[52] U.S. Cl. ..................................... 367/12; 367/901; 367/11; 364/413.25
[58] Field of Search ..................... 367/12, 901, 7, 11, 367/87; 364/413.25; 128/660.06

[56] References Cited

U.S. PATENT DOCUMENTS 4,796,237 1/1989 Hutchens et al. ........................ 367/35

FOREIGN PATENT DOCUMENTS 60-200183 3/1986 Japan .

Primary Examiner—Daniel T. Pihulic
Attorney, Agent, or Firm—Hill, Steadman & Simpson

[57] ABSTRACT

For suppressing reflections of an acoustic reception signal at a transmitting/receiving ultrasound transducer, the ultrasound transducer is connected to a compensation circuit which supplies the ultrasound transducer with a compensation transmission signal during reception, which has a waveform similar to the acoustic reception signal, but with a polarity opposite that of the acoustic reception signal. A summing stage is connected in a reception channel of the ultrasound transducer, the summing unit having a first input supplied with a compensated reception signal, formed by a combination of the acoustic reception signal and the compensation transmission signal. A second input of the summing unit is connected to the compensation circuit, which supplies a signal at the second input which removes the contribution made by the compensation transmission signal from the compensated reception signal, so that the output of the summing unit generates a reception signal devoided of the compensation transmission signal.

18 Claims, 2 Drawing Sheets

APPARATUS AND METHOD FOR SUPPRESSING REFLECTIONS AT AN ULTRASOUND TRANSDUCER

BACKGROUND OF THE INVENTION

1. Field of the Invention

The present invention is directed to an apparatus and method for suppressing reflections of an acoustic reception signal at a transmitting/receiving ultrasound transducer.

2. Description of the Prior Art

Investigations of factors contributing to the quality of ultrasound images have shown that the contrast between image regions with few echoes and image regions which are rich in echoes is reduced because, among other things, a mirror or ghost image of the primary image is superimposed on the ultrasound image. The mirror image arises due to multiple reflections or multiple scattering between the ultrasound transducer and an acoustic boundary layer in an examination region such as, for example, tissue to be examined. The multiple reflections arise because the acoustic characteristics of the transducer and the tissue (for example) are different. The echo signals arriving after a transmission pulse are partially reflected by the ultrasound transducer, and enter into the examination region as undesired, new transmission pulses, and in turn generate echo signals which the system incorporates into the overall image. An ideal transducer would not reflect the echo signals, but would absorb all of the acoustic reception energy which is incident thereon. The effect of multiple reflections would then not arise. Image disturbances due to multiple scatter within the tissue, and due to inhomogeneous distribution of the speed of sound therein, would merely remain.

Reflections at the transducer surface can be reduced by the use of one or more matching layers. Materials having an acoustic characteristic impedance lying between that of the tissue being examined and the transducer ceramic are employed for such matching layers. The matching layers usually have a thickness of one-quarter of the acoustic wavelength.

This technique yields an improvement compared to the case without such matching, however, the aforementioned multiple reflection effect is nonetheless not sufficient avoided.

A further possibility for minimizing multiple reflections is to arrange a damping layer between the transducer and the examination region. The reflections and the echo signals resulting therefrom must traverse this layer two times more often than the primary echo. The multiple reflections are therefore more highly attenuated relative to the primary echo, and are substantially suppressed depending on the attenuation value of the damping layer. A disadvantageous of this technique, however, is that energy is also removed from the primary echo. For compensating this unwanted attenuation of the primary echo, the transmission power can be boosted up to a limit determined by the permissible stress on the tissue. The maximum penetration depth, or depth of the examination region, however, is reduced in comparison to an unattenuated system, because the attenuation is not compensated for in the reception mode.

Another possibility, which has not as yet been developed into a practical embodiment is the employment of piezo materials having an acoustic characteristic impedance which lies closer to that of tissue than in the case of standard ceramics. For example, the ratio of the characteristic impedances of standard ceramic to tissue is approximately 20, while that of composite materials is approximately 10, and that of PVDF is 2.4. The reduction of reflections at the transducer surface achieved by this measure, however, is slight. A disadvantageous in the use of PDVF is that approximately eight times the transmission voltage is required to obtain the same output signal as in a ceramic transducer.

Another theoretical possibility is to employ a long, continuous, (i.e., ungraduated) matching layer. As of yet, however, this theoretical possibility has not been technically implemented. The combination of a PVDF or composite transducer with an ungraduated matching layer, for example, is also conceivable.

SUMMARY OF THE INVENTION

It is an object of the present invention to provide an apparatus and a method for an ultrasound transmission/reception system, wherein reflections caused by the different impedances of the ultrasound transducer and the ultrasound propagation medium or the examination region adjacent thereto are substantially avoided at the ultrasound transducer during reception.

The above object is achieved in an apparatus wherein the ultrasound transducer is connected to a compensation circuit which supplies the ultrasound transducer with a compensation transmission signal during reception, which has a waveform similar to that of the acoustic reception signal, but has a polarity opposite to the reception signal. The portion of the acoustic reception signal which would thus otherwise be reflected is compensated (cancelled) by the compensation transmission signal. A summing unit is connected in a reception channel for the transducer, the summing unit having a first input supplied with a compensated reception signal from the transducer, formed by the compensation transmission signal and an electrical reception signal corresponding to the acoustic reception signal. The second input of the summing unit is connected to the compensation circuit, and is supplied with a signal which removes the contribution to the compensated reception signal which was made by the compensation transmission signal. The output of the summing unit thus is a reception signal which has been devoided of the compensation transmission signal.

The above object is also achieved in a method for operating an ultrasound system including the steps of supplying an ultrasound transducer with a compensation signal during reception, which is similar in waveform to the acoustic reception signal, but which has a polarity opposite to the acoustic reception signal, thereby cancelling or compensating portion of the acoustic reception signal which would otherwise be reflected at the transducer. The contribution to the output of the ultrasound transducer which was made by the compensation transmission signal is subsequently removed from the electrical signal generated by the ultrasound transducer, so that an electrical signal results corresponding exclusively to the ultrasound reception signal, devoided of the compensation transmission signal.

The basic concept underlying the apparatus and method disclosed herein is that of artificially making the ultrasound transducer, which is acoustically hard because of its high characteristic impedance, as soft as tissue, or making it seem as soft as tissue, by active electrical excitation of the transducer. As a consequence of the hardness of the transducer material, the transducer surface does not, by itself, follow the extensions and contractions of the echo signal in the examination region or in tissue, but instead exhibits a resistance to these signal changes and as a consequence generates higher pressures. This leads to the reflection of a part of the echo power. When electrical excitation is used, in accordance with the principles of the present invention, to cause the transducer surface to fully follow the oscillation of the tissue, reflections are avoided. By such electrical excitation, for example, the reduction in thickness of the transducer as a consequence of a pressure wave of the echo signal is electrically intensified. This can also be interpreted as being a form of pressure compensation for the reflected part of the echo signal in a linear system. During the reception phase, the transducer generates an acoustic output (transmission) signal as a result of the electrical excitation, which is matched to the incoming acoustic echo signal such that the portion of the currently incoming echo signal caused by a reflection from the transducer is compensated (cancelled) to zero immediately in front of the transducer. The output signal generated by the transducer as a result of the electrical excitation is designed to be equivalent or similar to the acoustic reception signal, i.e., it has the same waveform except for amplitude, and has the opposite polarity. By this measure, no reflection arises.

In a further embodiment of the invention, the compensation circuit is additionally connected to the reception channel after the output of the summing unit, and includes a memory wherein a signal corresponding to the currently-received reception signal can be stored. The next compensation transmission signal can then be generated based on this stored signal.

In a further embodiment of the method, the compensation transmission signal is acquired from the reception signal from a first transmission/reception cycle, and the compensation transmission signal acquired in this manner is then supplied to the ultrasound transducer during reception in a subsequent transmission/reception cycle.

The method and apparatus disclosed herein represent a form of feedback loop, which is fundamentally stable by virtue of producing the compensation transmission signal for use in a current transmission/reception cycle from a preceding transmission/reception cycle. Without such "updating", under some conditions a positive feedback of the change in thickness of the ultrasound transducer can result in self-induced oscillations in a simple (closed loop) feedback system.

The compensation of reflections at the transducer described herein can be easily employed in combination with other measures for reducing reflections known in the art, of the type described above.

DESCRIPTION OF THE PREFERRED EMBODIMENTS

Figure 1:
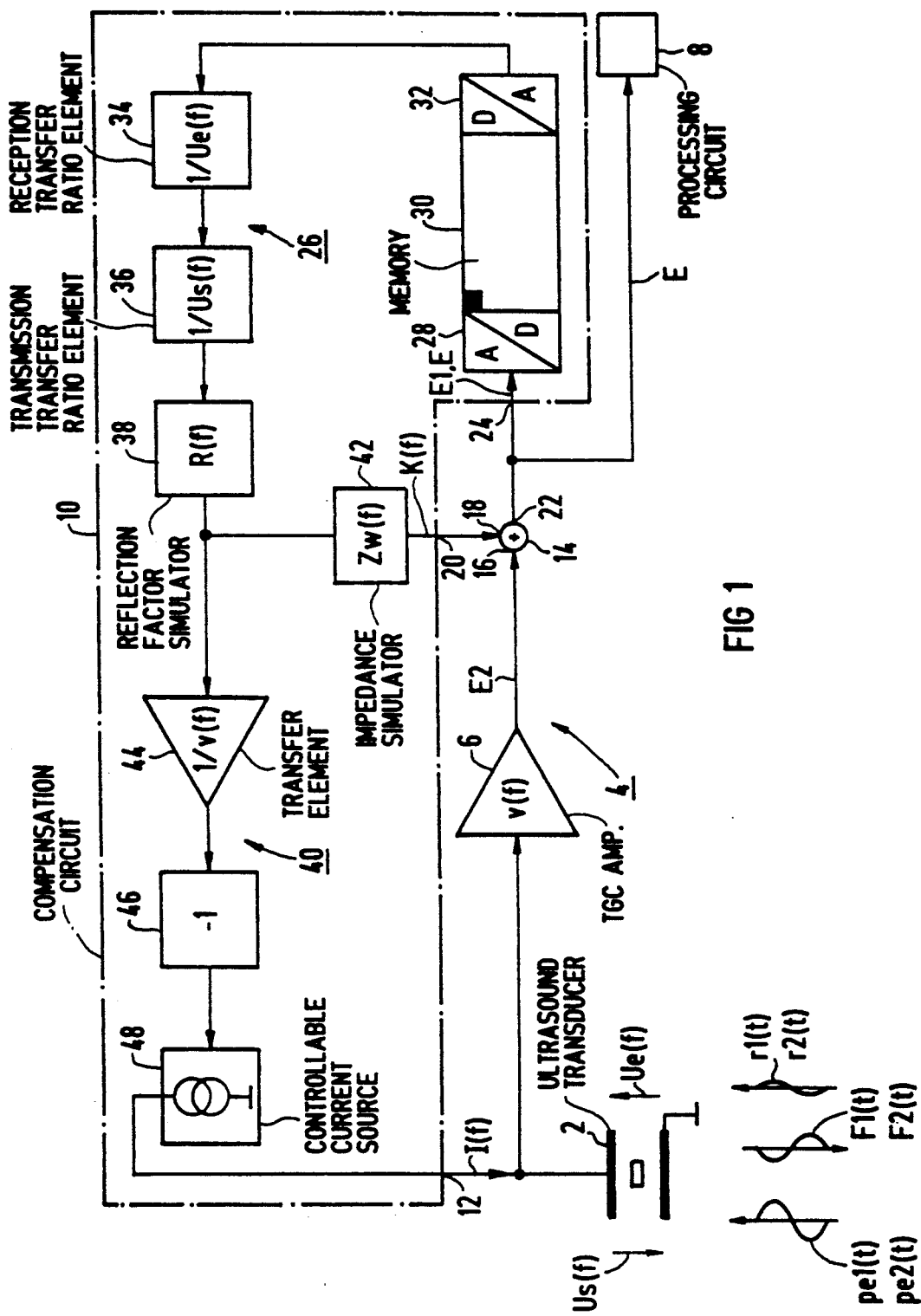
FIG. 1 is a block circuit diagram of an apparatus for compensating reflections at an ultrasound transducer, constructed in accordance with the principles of the present invention and for practicing the method of the invention, employing a digital memory and analog signal processing.

In the embodiment of the invention shown in FIG. 1, an ultrasound transducer 2 is connected to a reception channel 4 which includes a transmit gain controlled (TGC) amplifier 6 for compensating the attenuation of the ultrasound wave in tissue. The reception channel 4 generates an output in the form of a high-frequency echo signal E to processing electronics 8 which processes the echo signal E, together with other echo signals, to form an ultrasound image in a known manner.

The apparatus also includes a compensation circuit 10, having a first output 12 connected to the ultrasound transducer 2. The compensation circuit 10 conducts a compensation transmission signal l(f) to the ultrasound transducer 2 during reception. The compensation transmission signal l(f), after conversion by the ultrasound transducer 2 into an acoustic signal, is equivalent or similar to the reflected portion of the reception signal, or useful echo, pe2($t$), i.e., it has the same waveform (shape) but different amplitudes, and has a polarity which is opposite that of the reception signal pe2($t$). The compensation transmission signal l(f), when converted into such a corresponding acoustic signal, causes the reflected part F2($t$) of an incoming ultrasound pressure wave pe2($t$) to be cancelled, and thus the reflected part F2($t$) disappears.

A summing unit 14 is connected in the reception channel 4 having a first input 16 connected to the output of the TGC amplifier 6. The summing unit 14 has a second input 18 connected to a second output 20 of the compensation circuit 10. The output 22 of the summing unit 14 is connected to an input 24 of the compensation circuit 10, as well as to the processing electronics 8.

The compensation circuit 10 has a main branch 26 connected to the input 24. The main branch 26 is formed by a series-connected analog-to-digital converter 28, a memory 30, a digital-to-analog converter 32, an inverse reception transfer ratio element 34, an inverse transmission transfer ratio element 36, and a reflection factor simulator 38. Other than the allocation of analog-to-digital converter 28 and the digital-to-analog converter 32 relative to the memory 30, the sequence of the components in this series circuit is of no consequence from the theoretical viewpoint of signal processing.

A first subsidiary branch 40, connected to the output 12, and a second subsidiary branch 42, connected to the output 20, follow the main branch 26. The first subsidiary branch 40 includes a series circuit of a transfer element 44 having a transfer function which is the inverse of that of the TGC amplifier 6, an invertor 46 and a current source 48. Again, the sequence of the transfer element 44 and the invertor 46 can be theoretically reversed. The second subsidiary branch 42 includes only a transducer impedance simulator 42, which simulates a transducer impedance referenced Zw(f).

The operation of the apparatus shown in FIG. 1 in accordance with the inventive method, by which reflections at the ultrasound transducer 2 are compensated, shall be set forth below with reference to FIG. 1. The operation is described in the frequency domain, because it is simpler to present in that context. Multiplications in the frequency domain can be executed as convolution operations in the time domain.

In the transmission modes, the transducer 2 is characterized by a transmission transfer ratio Us(f), which indicates the relationship of complex sound pressure to complex transmission current. In the reception mode, the transducer 2 is characterized by the reception transfer ratio Ue(f), which indicates the relationship of complex reception voltage to complex sound pressure. The reflection factor R between the transducer 2 and the propagation medium (or tissue) disposed immediately adjacent the transducer 2 is frequency-independent without a matching layer and is a function R(f) of the frequency if a matching layer is present.

After a first transmission pulse, a useful echo signal, illustrated by the pressure curve pe1(t), reaches the ultrasound transducer 2. The transducer 2 reflects a part of this echo signal. The reflected part F1(f) is calculated as follows:

$$F1(f) = R(f) \cdot pe1(f).$$

Multiple reflections, indicated by the signal r1(t) in FIG. 1, result therefrom. The pressure curves pe1(f) and R1(f), transformed into the frequency domain, are converted into the conventional, electrical high-frequency echo signal E1 of an image line by the transducer 2, according to the transfer ratio Ue(f), and are stored in the memory 30 after digitization. The relationship between the stored signal E1 and the ultrasound pressure signals pe1(f) and r1(f) is as follows:

$$E1(f) = v(f) \cdot Ue(f) \cdot (pe1(f) + r1(f)).$$

Following this first transmission/reception cycle, transmission is again immediately undertaken in the same manner, and in the same direction, and corresponding signal parts pe2(t) and pe2(f) are subsequently received.

During this second (subsequent) transmission/reception cycle, the compensation transmission signal l(f), the generation of which shall be described below, is simultaneously supplied to the transducer 2 during reception. The superimposition of the compensation transmission signal l(f) during reception is achieved in the compensation circuit 10 of FIG. 1 by the parallel connection of a current source 48 with the transducer 2. It is also possible, however, to achieve such superimposition by a series connection of voltage sources.

The compensation transmission signal l(f) caused a pressure signal to be generated at the surface of the transducer 2 which approximately corresponds in amplitude to the reflected part F2(f) of the second reception signal pe2(f), because the signal received in the first transmission/reception cycle serves as model for the compensation transmission signal i(f) generated in the second transmission/reception cycle. The polarity of the compensation transmission signal l(f) in the second transmission/reception cycle is, however, opposite to the polarity of the reflected part F2(f) of the reception signal pe2(f).

For generating the compensation transmission signal l(f), the reception signal E1(f) is read out from the memory 30, and is converted back into an analog signal and is then filtered and amplified by the main branch 26 and by the first subsidiary branch 40 so that the compensation conditions are met. The relationship between the compensation transmission signal l(f) and the stored signal E1(f) is as follows:

$$l(f) = -R(f) \cdot (pe1(f) + r1(f)) / Us(f).$$

In the second transmission/reception cycle, the reflected part F2(f) of the reception signal pe2(f) is represented as follows:

$$F2(f) = R(f) \cdot pe2(f) - R(f) \cdot (pe1(f) + r1(f)).$$

The reflected part F2(f) is considered to be compensated (cancelled) to zero by the compensation signal l(f) when no relative motion occurs between the examination subject and the transducer 2 between the two transmission/reception cycles and when the multiple echo r1(f) of the first cycle is small in comparison to the echo signal pe1(f). A multiple echo r2(f) is thus no longer generated during the reception mode of the second cycle.

The compensated reception signal E2(f) at the output of the TGC amplifier 6, which is also supplied to the summing unit 14, is as follows:

$$E2(f) = Ue(f) \cdot v(f) \cdot pe2(f) - Zw(f) \cdot R(f) \cdot v(f) \cdot (pe1(f) + r1(f)) / Us(f).$$

A signal K(f), defined as follows:

$$K(f) = Zw(f) \cdot R(f) \cdot v(f) \cdot (pe1(f) + r1(f)) / Us(f)$$

is also supplied by the compensation circuit 10 to the summing unit 14 via the second input 18. This signal removes the contribution to the signal E2(f) made by the compensation signal i(f), so that a reception signal $$E(f) = Ue(f) \, v(f) \, pe2(f)$$

devoided of the compensation transmission signal l(f) is generated at the output of the summing unit 14, and is supplied to the processing electronics 8.

In the superimposition of the compensation transmission signal l(f), it must be ensured that the correct amplitude and phase relation with reference to the echo signal pe2(f) are employed, so that a good compensation (cancellation) is achieved. The phase difference between the two signals should be more than one-tenth of a period. It has been found that a visible improvement in the ultrasound image can be already seen if the multiple echo is lowered by 10 dB. Since the first echo signal E1(f), which is used for the generation of the transmission compensation signal l(f) still contains the disturbance of the multiple reflection r1(f), the acoustic signal generated by the transducer 2 corresponding to the compensation transmission signal l(f) will contain components corresponding to this multiple reflection r1(f). This disturbance, however, is negligibly small in comparison to the useful information of the echo signal pe1(f). In practice, at least 6 dB, due to the transducer reflection factor R(f), as well at least 20 dB due to tissue non-uniformities, are present between the useful information amplitudes and the multiple reflection amplitudes. The multiple reflection is attenuated by a factor of at least 10 through 20. This source of error can be ignored as long as a precision in the compensation below 5% is not sought. Further multiple reflections, with the exception of multiple reflections due to these initial multiple reflections, are thus substantially eliminated. Deviations in the signal content of the compensated reception signal E(f) obtained during reception in the second transmission/reception cycle, as compared to the previously-received signal, now correspond only to differences in artifacts in the examination region. An undisturbed signal can thus be reconstructed from the information obtained in the two reception cycles in a known manner.

The necessary signal processing with the required precision demands can be easily achieved in an apparatus having a digital front end. The main sources of error in the compensation can arise due to the following factors. The initial multiple reflection $r1(f)$ may be larger than desired. The reflection factor $R(f)$ may not be known precisely enough due to tissue differences. Motion artifacts may arise because of movements between the two transmission/reception cycles. Phase quenching of the reception signal may occur because of an excessively large transducer surface. Lastly, calculating imprecisions may arise in the analog signal processing.

It should also be noted with respect to the aforementioned problem of phase quenching that the compensation is especially successful if the directional characteristic of the reflection from the transducer 2 is known, in order to be able to emit the acoustic compensation signal in the same direction. Given a large-area transducer, for example, no conclusions can be made based on the reception signal regarding the direction from which reception occurred, or the direction along which reflection will occur. A weak signal can arise both from a weak reflection in the main lobe and from a strong reflection in the side lobe. In other words, an obliquely incident wavefront can be only incompletely compensated due to the presence of phase quenching at the transducer surface because transmission can be primarily undertaken only in the principal emission direction for compensation purposes. The condition for exact compensation is met only in the context of theoretical punctiform transducer, without a directional characteristic, which transmits and receives uniformly. The method disclosed herein, therefore, can be employed to best advantage in a two-dimensional array having small elementary transducers whose dimensions are less than half the acoustic wavelength. Satisfactory results, however, can still be achieved given a linear array or a phased array, wherein the elementary transducers have a side length which is larger than half the acoustic wavelength.

If unacceptably large multiple reflections $r1(f)$ arise in the first transmission/reception cycle, the process can be repeated by iteration until acceptably small multiple reflections are obtained, however, this must be undertaken at the expense of an increased time to construct the ultrasound image.

As noted above, in the embodiment of FIG. 1 the calculating steps are undertaken by analog elements, such as filters. The transducer impedance $Zw(f)$ can alternatively, for example, be simulated by a symmetry converter.

Figure 2:
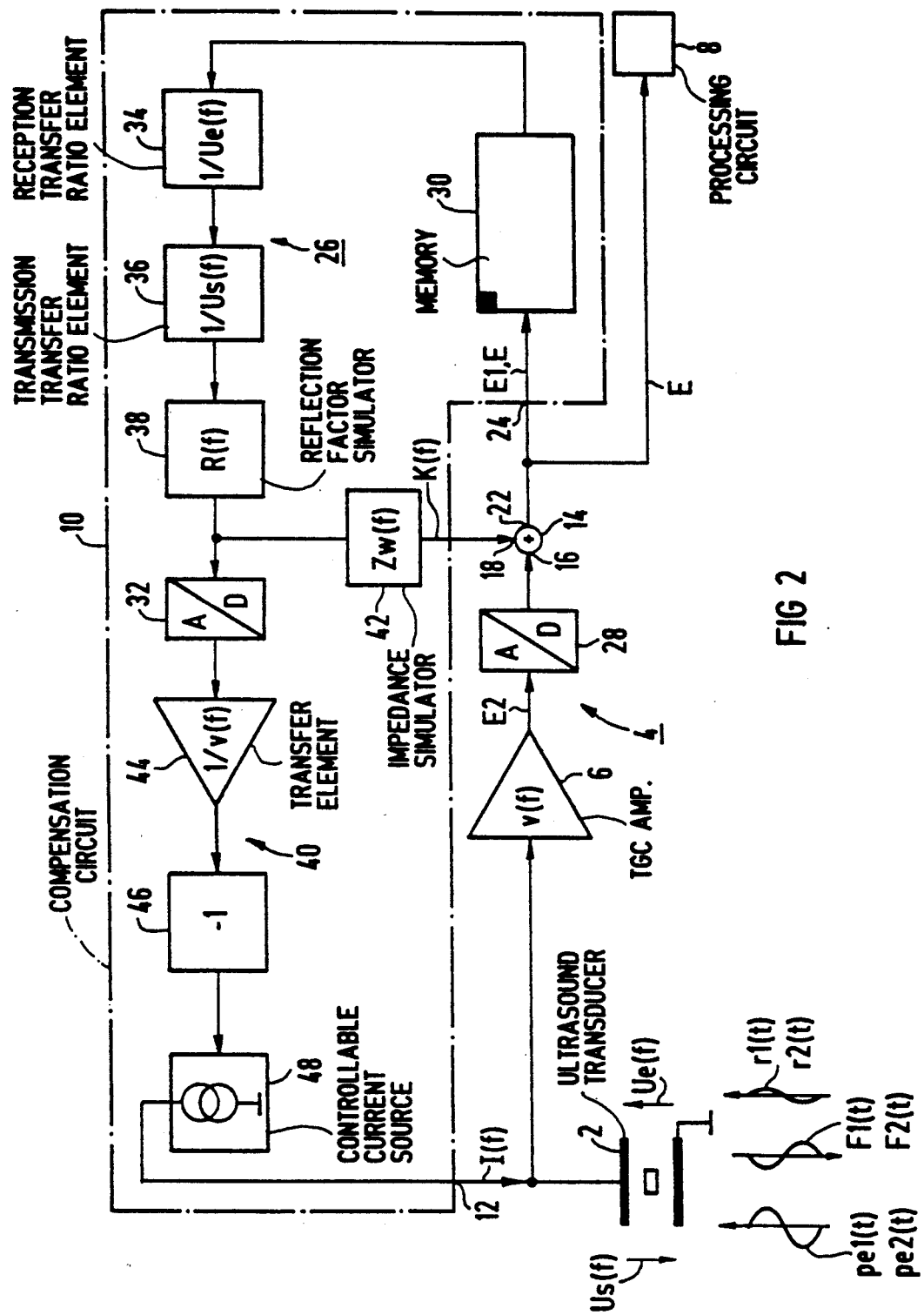
FIG. 2 is a block circuit diagram of an apparatus for suppressing reflections at a ultrasound transducer, constructed in accordance with the principles of the present invention and for practicing the method of the invention, employing digital signal processing.

The compensation circuit in the embodiment of FIG. 2 differs from the circuit of FIG. 1 only on the basis of the analog-to-digital converter 28 and the digital-to-analog converter 32. In the embodiment of FIG. 2, the entire signal processing in the main branch 26, in the second subsidiary branch 42, and in the summing unit 14 is realized in digital technology, and the majority of the calculation can be undertaken with digital filters or using digital convolution. for reasons of dynamics, (i.e., the range of signal processing capability), the TGC amplifier 6 and the transfer element 44 are retained in analog technology. Since time-dependent amplifiers are known in the art which can be manufactured to a synchronization precision of 1 dB, this does not cause any significant degradation of the calculating precision.

The memory 30 in both embodiments is a vertical format buffer, and thus transmission must be undertaken twice for one transmission beam direction. The sampling rate is thus halved. This disadvantage can be avoided if a plurality of vertical format buffers, corresponding to the number of different sampling directions, is allocated to the transducer 2. The current sampling line from the preceding image is then stored in the memory, and is read out for undertaking the above-described compensation and for generating the compensation transmission signal, i.e., the signal $E(f)$ is obtained and stored for a line instead of one reception event, as described above, resulting in the signal $E1(f)$. Motion artifacts must thereby be taken into consideration over the time of a sampling pass scan for an entire ultrasound image of approximately 30 ms, as opposed to between two successive transmission bursts of only 300 $\mu$s. Systems having a lower number of transmission events such as, for example, synthetic apertures or "exploso scan," similarly require only a small number of memories.

If the transducer 2 is part of a transducer array, a compensation circuit 10 with a memory 30 can be provided for each elementary transducer comprising the array.

Although modifications and changes may be suggested by those skilled in the art, it is the intention of the inventors to embody within the patent warranted hereon all changes and modifications as reasonably and properly come within the scope of their contribution to the art.

We claim as our invention:

1. An apparatus for suppressing reflections of an acoustic reception signal at an ultrasound transducer comprising:

an ultrasound transducer operable in a transmission mode for transmitting an acoustic transmission signal and in a reception mode for receiving an echo of said acoustic transmission signal as an acoustic reception signal, with a portion of said acoustic reception signal being reflected at said ultrasound transducer;

means for generating an electrical compensation signal, supplied to said ultrasound transducer during said reception mode, for conversion by said ultrasound transducer into an acoustic compensation signal for cancelling said reflected portion of said acoustic reception signal at said ultrasound transducer, and thereby causing said ultrasound transducer to generate a compensated electrical signal consisting of an electrical reception signal, corresponding to said acoustic reception signal, and said electrical compensation signal; and addition means, having a first input supplied with said compensated electrical signal and a second input supplied with signal generated by said means for generating an electrical compensation signal for cancelling said electrical compensation signal in said compensated electrical signal, for generating an output consisting of said compensated electrical signal devoided of said electrical compensation signal.

2. An apparatus as claimed in claim 1 wherein said means for generating an electrical compensation signal includes a feedback loop supplied with said output of said addition means.

3. An apparatus as claimed in claim 2 wherein said feedback loop includes a memory for storing an output of said addition means obtained during a first transmission/reception cycle of said ultrasound transducer for use by said means for generating an electrical compensation signal in generating an electrical compensation signal for a subsequent transmission/reception cycle of said ultrasound transducer.

4. An apparatus as claimed in claim 2 wherein said ultrasound transducer is disposed in a propagation medium and wherein said ultrasound transducer exhibits a reflection factor between said ultrasound transducer and said propagation medium, and wherein said means for generating an electrical compensation signal includes means for simulating said reflection factor for inclusion as a factor in said electrical compensation signal.

5. An apparatus as claimed in claim 2 wherein said ultrasound transducer exhibits a transmission transfer characteristic and a reception transfer characteristic, and wherein said means for generating a compensation signal includes means for generating a factor which is an inverse of said reception transfer characteristic and means for generating a factor which is an inverse of said transmission transfer characteristic for inclusion as factors in said electrical compensation signal.

6. An apparatus as claimed in claim 2 wherein said ultrasound transducer is disposed in a propagation medium and exhibits a reflection factor between said ultrasound transducer and said propagation medium, and wherein said ultrasound transducer has a transmission transfer characteristic and reception transfer characteristic, and wherein said feedback loop comprises:
 a first branch having, in series a memory supplied with said output of said addition means, means for forming a factor which is an inverse of said transmission transfer characteristic, means for forming a factor which is an inverse of said reception transfer characteristic, and means for forming a factor which is a simulation of said reflection factor, said first branch having a first branch output at which a signal formed by the product of the contents of said memory, said inverse factors, and said reflection factor is present;
 a second branch connected between said first branch output and said ultrasound transducer, and said first input of said addition means, including controllable current generator means for generating a current as said electrical compensation signal from said first branch output; and
 a third branch connected between said first branch output and said second input of said addition means.

7. An apparatus as claimed in claim 6 wherein said electrical reception signal is a voltage signal and wherein said ultrasound transducer has a transducer impedance which relates said current forming said electrical compensation signal to said voltage signal, and wherein said third branch of said feedback loop includes means for forming a factor simulating said transducer impedance for multiplication with said first branch output.

8. An apparatus as claimed in claim 6 further comprising a transit gain-controlled amplifier, having a transfer characteristic, connected between said ultrasound transducer and said first input of said addition means, and wherein said second branch of said feedback loop includes means for generating a factor which is an inverse of said transfer characteristic of said transit gain-controlled amplifier for multiplication with said first branch output.

9. An apparatus as claimed in claim 3 wherein said memory is a digital memory.

10. An apparatus as claimed in claim 3 wherein a plurality of said outputs of said addition means, corresponding to a plurality of compensated electrical signals, form a scan line of an ultrasound image to be generating using said ultrasound transducer, and wherein said memory is a vertical format buffer means for storing all of said outputs of said addition means forming a scan line.

11. An apparatus as claimed in claim 3 wherein a plurality of said outputs of said addition means, corresponding to a plurality of compensated electrical signals, form a scan line of an ultrasound image to be generated using said ultrasound transducer, said ultrasound image including a plurality of scan lines, and wherein said memory is a memory matrix means for storing line-by-line all scan lines of said ultrasound image.

12. An apparatus as claimed in claim 9 further comprising an analog-to-digital converter connected in front of said memory and a digital-to-analog converter connected after said memory.

13. An apparatus as claimed in claim 9 further comprising an analog-to-digital converter connected preceding said first input of said addition means, and a digital-to-analog converter connected at an input of said feedback loop.

14. An apparatus as claimed in claim 1 wherein said ultrasound transducer is disposed in an acoustic propagation medium having an acoustic wavelength for sound, and wherein said ultrasound transducer has at least one side which is shorter than half said acoustic wavelength.

15. A method for suppressing reflection of an acoustic reception signal at an ultrasound transducer comprising the steps of:
 operating an ultrasound transducer in an initial transmission mode for transmitting an acoustic transmission signal;
 operating said ultrasound transducer in an initial reception mode for receiving an echo of said acoustic transmission signal as an acoustic reception signal with a portion of said acoustic reception signal being reflected at said ultrasound transducer;
 generating an electrical compensation signal from said acoustic reception signal and supplying said electrical compensation signal to said ultrasound transducer during a subsequent reception mode for operating said ultrasound transducer to cancel a reflected portion of a subsequent acoustic reception signal received in said subsequent reception mode at said ultrasound transducer, and causing said ultrasound transducer to generated a compensated electrical signal consisting of an electrical reception signal, corresponding to said subsequent acoustic reception signal, and said electrical compensation signal; and
 combining said compensated electrical signal with a signal for cancelling said electrical compensation signal in said compensated electrical signal and thereby generating an output signal consisting of said compensated electrical signal devoided of said electrical compensation signal.

16. A method as claimed in claim 15 wherein the step of generating an electrical compensation signal is further defined by the steps of:

generating an electrical compensation signal in one transmission/reception cycle of said ultrasound transducer; and generating an electrical compensation signal for use in a subsequent transmission/reception cycle of said ultrasound transducer from the output obtained in said first transmission/reception cycle.

17. A method as claimed in claim 16 wherein said subsequent transmission/reception cycle immediately follows said first transmission/reception cycle.

18. A method as claimed in claim 16 comprising the additional steps of:

operating said ultrasound transducer in said transmission and reception modes in a plurality of transmission/reception cycles in a first scan pass respectively to form a plurality of scan lines, said scan lines in combination forming an ultrasound image;

conducting a second scan pass for all of said scan lines in said ultrasound image; and for each transmission/reception cycle in said second scan pass, using the output obtained in the corresponding transmission/reception cycle of said first scan pass to form said electrical compensation signal.

* * * * *